(12) United States Patent
Arnold, III

(10) Patent No.: US 10,302,248 B2
(45) Date of Patent: May 28, 2019

(54) UNIVERSAL CANOPY SUSPENSION SYSTEM FOR MULTIPLE FUNCTIONING EMBODIMENTS

(71) Applicant: Frank Steele Arnold, III, Brookhaven, MS (US)

(72) Inventor: Frank Steele Arnold, III, Brookhaven, MS (US)

( * ) Notice: Subject to any disclaimer, the term of this patent is extended or adjusted under 35 U.S.C. 154(b) by 0 days.

(21) Appl. No.: 14/757,085

(22) Filed: Nov. 16, 2015

(65) Prior Publication Data

US 2017/0138531 A1    May 18, 2017

(51) Int. Cl.
| | | |
|---|---|---|
| *F16M 13/02* | (2006.01) | |
| *F16M 11/10* | (2006.01) | |
| *F16M 11/28* | (2006.01) | |
| *F16M 11/20* | (2006.01) | |

(52) U.S. Cl.
CPC .......... *F16M 13/022* (2013.01); *F16M 11/10* (2013.01); *F16M 11/2078* (2013.01); *F16M 11/28* (2013.01)

(58) Field of Classification Search
CPC .. F16M 13/022; F16M 11/10; F16M 11/2078; F16M 11/28; G09F 2007/1804; G09F 2007/1834; A47G 29/1216; A47K 1/00
USPC ....... 248/218.4, 917, 919–923, 219.1, 219.2, 248/276.1, 277.1, 278.1; 224/541; 254/323; 280/479.1, 408, 456.1, 460.1, 280/463
See application file for complete search history.

(56) References Cited

U.S. PATENT DOCUMENTS

| | | | | |
|---|---|---|---|---|
| 522,216 A | * | 7/1894 | Jones | E04H 12/24 |
| 1,636,185 A | * | 7/1927 | Goodwin | E04G 5/067 |
| | | | | 248/245 |
| 3,493,208 A | * | 2/1970 | Masataro | E04G 5/06 |
| | | | | 182/186.9 |
| 4,170,336 A | * | 10/1979 | Malis | F16M 11/10 |
| | | | | 248/279.1 |

(Continued)

*Primary Examiner* — Nkeisha Smith
(74) *Attorney, Agent, or Firm* — Craig R. Miles; CR MILES P.C.

(57) ABSTRACT

A suspension system for the attachment of a multiple embodiments, including flat screen televisions and other embodiments connected beneath the roof of a canopy-styled tent or other overhead structure. The system's bracket is comprised of a single or multiple arms that universally grip the frame of the said canopy-styled tent or overhead structure. Suspension is not limited to a television, but also other embodiments, either powered by a plug or battery, or not powered. The bracket is manufactured in steel, aluminum, polymer, or like material. The system's fan blades are comprised of foam, rubber, or other soft matter. The suspension system allows the television's or other attached embodiment's height to be manipulated by a process further shown in this application. The system allows for further embodiments to be attached for not only television screens, but a projector, scoring devices for all kinds of sports, bingo or casino activities, golf or swim events, lighting or heating needs, the elevation and secure attachment of medical equipment, entertainment contraptions, or the mounting of additional embodiments. The suspension system and its embodiments are portable and may be broken down into a self-contained bag or case for easy transport.

16 Claims, 3 Drawing Sheets

(56) References Cited

U.S. PATENT DOCUMENTS

| | | | | |
|---|---|---|---|---|
| 4,447,031 | A * | 5/1984 | Souder, Jr. | F16M 11/126 248/281.11 |
| 4,964,606 | A * | 10/1990 | Beam | F16M 11/14 248/188.5 |
| 7,303,527 | B2 * | 12/2007 | Ng | A61B 1/303 248/124.1 |
| 7,546,993 | B1 * | 6/2009 | Walker | A61M 5/1415 248/218.4 |
| 7,913,980 | B1 * | 3/2011 | Cipriano | B66D 3/08 248/218.4 |
| 8,651,444 | B2 * | 2/2014 | Sapper | F16M 11/2021 248/218.4 |
| 8,998,157 | B2 * | 4/2015 | Culberson | H05K 5/0017 248/231.61 |
| 2002/0011544 | A1 * | 1/2002 | Bosson | F16M 11/041 248/121 |
| 2002/0194792 | A1 * | 12/2002 | Feldpausch | F16M 11/08 52/36.1 |
| 2003/0141425 | A1 * | 7/2003 | Obdeijn | F16M 11/045 248/317 |
| 2005/0035253 | A1 * | 2/2005 | Rixom | F16M 11/041 248/284.1 |
| 2005/0199769 | A1 * | 9/2005 | Rudder | F16M 11/10 248/218.4 |
| 2015/0028173 | A1 * | 1/2015 | Randel | A45C 11/26 248/218.4 |

\* cited by examiner

UNIVERSAL CANOPY SUSPENSION SYSTEM FOR MULTIPLE FUNCTIONING EMBODIMENTS

FIELD OF THE INVENTION

This application relates to the use of a television screen and its embodiments to an outdoor canopy-styled tent.

BACKGROUND OF THE INVENTION

Canopy-styled tents have multiple legs, a roof, and sometimes side walls. They have been used for hundreds of years as shelter, however, they are limited when it comes to furnishings due to limited space and the fact that their use is usually temporary. However, when under canopy, those seeking shelter tend to want it as homey as possible. One problem some people have is when a television is brought to watch a game or keep up with current events, it hard to find the right place to put it. The one table that was brought for the party is now covered with food and placing it on the corner of the table or the ground is too dangerous.

There are currently no flat screen attachment brackets for the 10.time.10 or 20.times.20 canopy tents. I have researched this project with professional guidance for quite some time to come to this conclusion. I have witnessed the attachment of many televisions attached for viewing at golf tournaments. The tents the screens were mounted in were very large and they were bolted in with commercial grade hardware. These large types of brackets not only would not fit in the smaller type canopy tents, but they would be dangerous for those attempting to view what was showing.

There is also an option for those outdoors seeking the entertainment of screen time to use a projector and blow up screen. However, under a canopy tent, until now that would have not been possible. Our Universal Canopy Suspension System for Multiple Functional Embodiments changes this and will allow a projector to be attached and the picture to be cast on to the opposite side wall of your canopy tent or across the way to a screen.

The weight of older "box style" televisions to the ceiling or corners of a canopy-styled tent makes it risky to attempt attachment, but the newer flat screen/LCDs are so much lighter and extremely safe. Rigorous construction, proper engineering, years of designing and field testing have not only proven that our suspension system functions properly, but that it safely operates well above weight tolerances it will face in the hands of the consumer. The suspension system can be attached to multiple or single canopy poles running diagonal, horizontal, or perpendicular.

We also feel like it is an advantage over those viewing the television that has been set of the tailgate on top of the table that the screen is now high up under the protection of the canopy from weather and light reflection. The height adjustment is a benefit when it comes to others walking into another's view and the fact that cords are out of the way from being tripped on is also an advantage over the table placement. On a final note, the table is a lot heavier than a shoulder strapped bag with a Universal Canopy Suspension System for Multiple Functional Embodiments inside of it.

SUMMARY OF THE INVENTION

A broad object of a particular embodiment of the invention can be to provide a suspension system including a bracket comprising: single or plurality of arms; single or multiple grasping mechanical grasping hands communicating between the arms and external surfaces; and a plurality of elongate arms extending multidirectional from the base, each elongate arm including an upwardly extending coupler directly connected to the elongate arm, the upwardly extending coupler configured to couple to a pole which supports a canopy. The suspension system further includes a base to couple to an auxiliary element. That said element height, angle, and left to right pitch is easily adjusted and locked into desired place by the suspension system.

Naturally, further objects of the invention are disclosed throughout other areas of the specification, drawing %, and claims.

Figure 1:
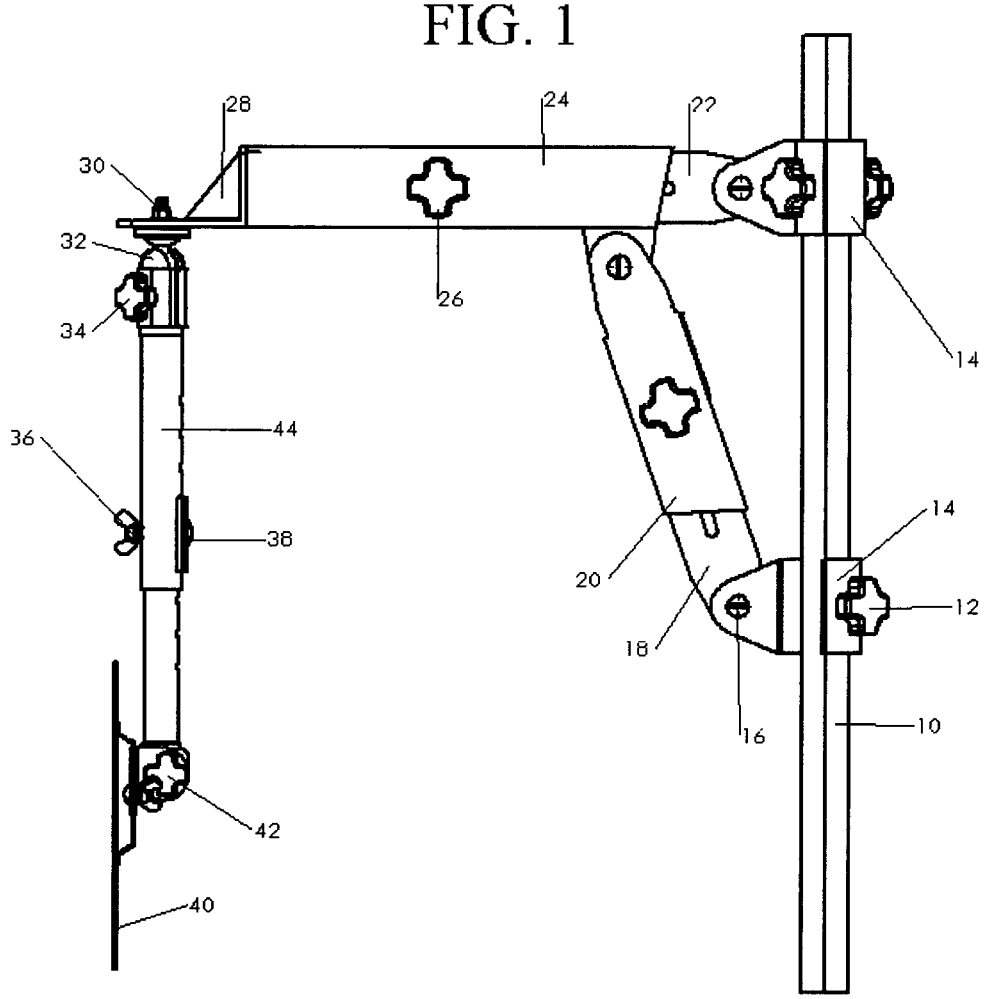
FIG. 1 is a side view of a particular embodiment of a bracket of the suspension system.
Figure 2:
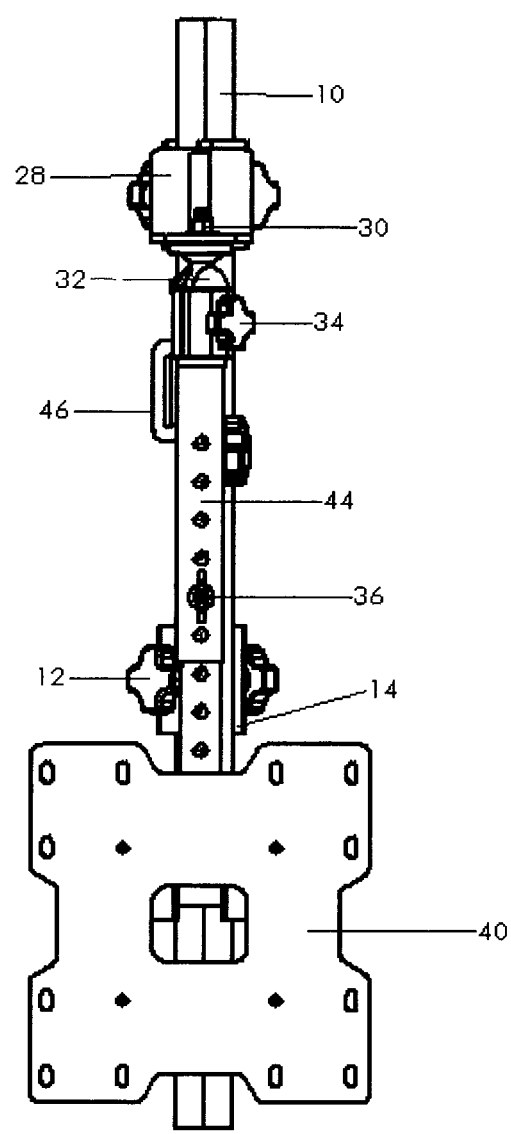
FIG. 2 a front perspective view of a particular embodiment of a bracket of the suspension system.
Figure 3:
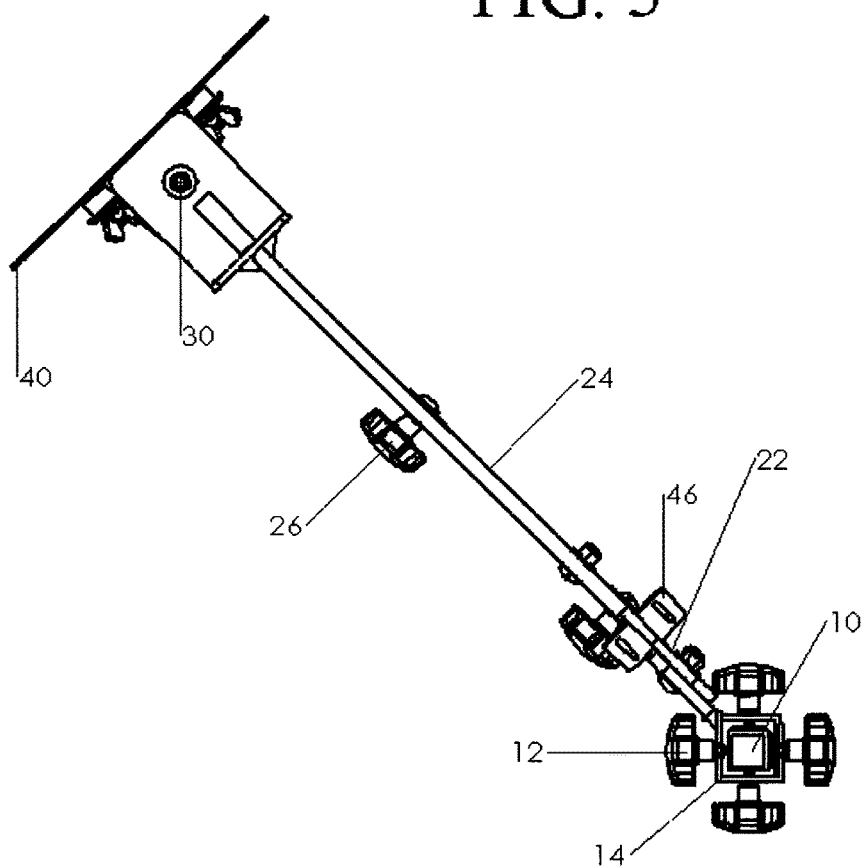
FIG. 3 is a top perspective view of a particular embodiment of a bracket of the suspension system.

NUMERICAL INDICATOR KEY 10 support structure for the canopy tent
12 clamping knob
14 grasping hands
16 arm hinges
18 interior lower bracket arm
20 exterior lower bracket arm
22 interior upper bracket arm
24 exterior upper bracket arm
26 arm adjustment locking knob
28 "L" connector
30 locking swivel nut
32 ball joint or like connector
34 ball joint or like tightening knob
36 downrod height adjuster wing nut
38 downrod height adjuster bolt
40 television mounting plate
42 mounting plate tilt knob
44 downrod
46 hole for connection of nylon safety straps

DETAILED DESCRIPTION OF THE INVENTION

The advantage of the Universal Canopy Suspension System for Multiple Functional Embodiments is that it provides entertainment and information to the user of a canopy-styled tent by providing them a safe and functional way of attaching their television or other embodiment. Their television, while at a game or camping, is now out of the way and off the table, from where it once was placed during use. Now that the new suspension system is being used, there is less chance that the television will get bumped or damaged by falling off the table. There is also less chance of other people in attendance walking in front of the suspended television's or other suspended embodiment due to is elevation now coupled below the "L" connector 28. Wire that once traversed from a waist high table's edge now can be tethered via zip ties or other simple coupling devices safely to one of the many canopy tent's support poles 10. This means less chance of someone tripping over a cord when there television is mounted high up under the lip of the canopy. Their television is also protected from the wind and rain using the suspension system. To further raise the television or embodiment, the user of the devise simply loosens the locking knobs 26 and pushes the embodiment into the desired location. The grasping hands 14 will not move because they are now locked into place by their shape, engineered design, and each one having its own clamping knob 12, but the suspension systems upper and lower exterior arms 24 and 20 will slide over the upper and lower interior arms 18 and 22, allowing the "L" connector 28 to come to rest and be locked in exactly where the user wants it to be located. Other adjustment of the suspended embodiment can be made below the "L" connector 28 by a ball joint or like connector 32. However, we would not want to limit adjustment of embodiment to only our ball and joint mechanism 32. Adjustments can be made to tethers and couplers of all sorts of tethering and coupling devises, such as a said ball and joint, but is not limited to: a clamping knob, a nut and bolt, screws, a hook and loop strap, rope, tape, a bungee cord, a pin, and a clip or hinge.

Other benefits are also possible with the Universal Canopy Suspension System for Multiple Functional Embodiments. The unit can have a projector attached to it and cast the game or movie toward a screen. The suspension system or bracket can also have other postings on different types of screens. A screen attached inside a canopy can inform a swimmer what heat and lane they are to swim in a few minutes. A woman might find out from another screen hanging from a bracket that G34-G34 just got her BINGO! Another Red Cross nurse in Paris might find out under her canopy tent when a second shift is coming to relieve her. These embodiments can be moved and locked into appropriate and safe locations by the user and further secured by safety straps connected to the suspension system's holes for connection of nylon safety straps 46.

There are different applications for this suspension, but this is a lightweight and easily portable system designed for people on the move. Military and civilian alike can benefit from this being used. Because the system is so compact and can be shouldered in a small case, this is unlike anything currently available on the market today. It is manufactured out of a rugged material to firmly and safely hold what you hang from it.

The invention claimed is:

1. A suspension system comprising:
   an upper grasping hand having an upper grasping hand open sided channel continuously extending between opposite upper grasping hand open ends;
   a first clamping knob operatively coupled to said upper grasping hand, said first clamping knob operable to secure a support pole at a fixed position in said upper grasping hand open sided channel;
   a lower grasping hand having a lower grasping hand open sided channel continuously extending between opposite lower grasping hand open ends;
   a second clamping knob operatively coupled to said lower grasping hand, said second clamping knob operable to secure said support pole at a fixed position in said lower grasping hand open sided channel, wherein an open side of said lower grasping hand open sided channel offset about ninety degrees in relation to an open side of said upper grasping hand open sided channel;
   an upper arm having an upper arm first end coupled to said upper grasping hand;
   a lower arm having a lower arm first end coupled to said lower grasping hand, and a lower arm second end coupled to said upper arm; and
   a mounting plate coupled to said upper arm second end, said mounting plate configured to support an auxiliary element.

2. The suspension system of claim 1, wherein said upper arm first end pivotally connected to said upper grasping hand.

3. The suspension system of claim 1, wherein said lower arm first end pivotally connected to said lower grasping hand.

4. The suspension system of claim 1, wherein said auxiliary element is selected from the group consisting of: a fan, a light, a heater, a television mounting system, medical equipment, a monitor, a gaming device, and an extension pole.

5. The suspension system of claim 1, wherein said auxiliary element comprises a screen.

6. The suspension system of claim 1, wherein said auxiliary element comprises a television screen.

7. The suspension system of claim 1, wherein said auxiliary element comprises a flat-screen television.

8. The suspension system of claim 1, wherein said auxiliary element comprises a projector.

9. A method of attaching an auxiliary element to a canopy-styled tent, comprising:
   obtaining a suspension system comprising:
      an upper grasping hand having an upper grasping hand open sided channel continuously extending between opposite upper grasping hand ends;
      a first clamping knob operatively coupled to said upper grasping hand, said first clamping knob operable to secure a support pole at a fixed position in said upper grasping hand open sided channel;
      a lower grasping hand having a lower grasping hand open sided channel continuously extending between opposite lower grasping hand open ends;
      a second clamping knob operatively coupled to said lower grasping hand, said second clamping knob operable to secure said support pole at a fixed position in said lower grasping hand open sided channel, wherein an open side of said lower grasping hand open sided channel offset about ninety degrees in relation to an open side of said upper grasping hand open sided channel;
      an upper arm having an upper arm first end coupled to said upper grasping hand;
      a lower arm having a lower arm first end coupled to said lower grasping hand, a lower arm second end coupled to said upper arm; and
      a mounting plate coupled to said upper arm second end,
   disposing a support pole within said upper and lower grasping hand open sided channels;
   operating a first clamping knob operatively coupled to said upper grasping hand to fix position of said upper grasping hand in relation to said support pole;
   operating a second clamping knob operatively coupled to said lower grasping hand to fix position of said lower grasping hand in relation to said support pole; and
   coupling an auxiliary element to said mounting plate.

10. The method of claim 9, further comprising aligning said upper and lower grasping hand channels in vertical spaced apart relation on said support pole.

11. The method of claim 9, wherein said auxiliary element is selected from the group consisting of: a fan, a light, a heater, a television mounting system, medical equipment, a monitor, a gaming device, and an extension pole.

12. The method of claim 9, wherein said auxiliary element comprises a screen.

13. The method of claim 9, wherein said auxiliary element comprises a television screen.

14. The method of claim 9, wherein said auxiliary element comprises a flat-screen television.

15. The method of claim 9, wherein said auxiliary element comprises a projector.

16. A suspension system comprising:
- an upper grasping hand having an upper grasping hand open sided channel continuously extending between opposite upper grasping hand open ends coupled to support pole in a canopy tent structure;
- a lower grasping hand having a lower grasping hand open sided channel continuously extending between opposite lower grasping hand open ends coupled to support pole in a canopy tent structure, wherein an open side of said lower grasping hand open sided channel offset about ninety degrees in relation to an open side of said upper grasping hand open sided channel;
- an upper arm having an upper arm first end pivotally coupled to said upper grasping hand;
- a lower arm having a lower arm first end pivotally coupled to said lower grasping hand, said lower arm having a lower arm second end pivotally coupled at a fixed location to said upper arm; and
- a mounting plate coupled to said upper arm second end, said mounting plate configured to support an auxiliary element.

* * * * *